US007087555B2

(12) United States Patent
Halliday et al.

(10) Patent No.: US 7,087,555 B2
(45) Date of Patent: Aug. 8, 2006

(54) DRILLING FLUIDS COMPRISING SIZED GRAPHITE PARTICLES

(75) Inventors: William S. Halliday, Cypress, TX (US); David W. Schwertner, The Woodlands, TX (US); S. Dwight Strickland, Kingwood, TX (US)

(73) Assignee: Baker Hughes Incorporated, Houston, TX (US)

( * ) Notice: Subject to any disclaimer, the term of this patent is extended or adjusted under 35 U.S.C. 154(b) by 154 days.

(21) Appl. No.: 10/818,591

(22) Filed: Apr. 6, 2004

(65) Prior Publication Data

US 2004/0224852 A1 Nov. 11, 2004

Related U.S. Application Data

(60) Provisional application No. 60/460,939, filed on Apr. 7, 2003.

(51) Int. Cl.
*C09K 8/02* (2006.01)
*C09K 8/05* (2006.01)
*C09K 8/32* (2006.01)
*E21B 21/00* (2006.01)

(52) U.S. Cl. ............... 507/140; 166/305.1; 175/65; 428/402

(58) Field of Classification Search ............ 160/305.1; 507/140
See application file for complete search history.

(56) References Cited

U.S. PATENT DOCUMENTS

| 5,401,719 A | 3/1995 | DeBeer |
| 5,826,669 A | 10/1998 | Zaleski et al. |
| 5,942,467 A * | 8/1999 | Rayborn et al. ............ 507/106 |
| 6,632,527 B1 * | 10/2003 | McDaniel et al. .......... 428/402 |
| 6,750,179 B1 * | 6/2004 | Burts, Jr. .................... 507/104 |
| 2002/0048676 A1 * | 4/2002 | McDaniel et al. .......... 428/404 |
| 2003/0132000 A1 | 7/2003 | Shaarpour |

FOREIGN PATENT DOCUMENTS

WO    WO 02/22759 A    3/2002

OTHER PUBLICATIONS

Conversion of MESH to aperture (mm), VWR Chromatography, http://www.chromatography.co.uk/TECHNIQS/Other/Mesh.htm, 2000, '01, '02.*

* cited by examiner

*Primary Examiner*—Randy Gulakowski
*Assistant Examiner*—Timothy J. Kugel
(74) *Attorney, Agent, or Firm*—Paula Morris; Morris & Amatong, P.C.

(57) ABSTRACT

Drilling fluid systems, graphite particle mixtures, and methods for use thereof including: (a) drilling fluid systems having effective rheology and lubricity properties comprising a suspension of graphite particles having a particle size distribution sufficient to permit greater than 65 wt. % of the graphite particles to pass through a shaker screen having a mesh size of about 80 or less; and (b) spotting fluids having effective rheology comprising graphite particles having an average particle size of 120 mesh or greater.

20 Claims, 3 Drawing Sheets

DRILLING FLUIDS COMPRISING SIZED GRAPHITE PARTICLES

CROSS REFERENCE TO RELATED APPLICATIONS

The present application claims the benefit of U.S. Provisional application Ser. No. 60/460,939 filed Apr. 7, 2003, now expired.

FIELD OF THE APPLICATION

The present application relates to system fluids used during drilling operations comprising graphite particles which are optimally sized for the particular type of system fluid.

BACKGROUND OF THE APPLICATION

Graphite particles are useful in system fluids used during drilling operations as an alternative mechanical lubricant to glass and/or plastic beads to reduce torque and drag on the drilling assembly. Unfortunately, the particle size distribution of commercially available graphites is either too large or too small for optimum use in most system fluids.

SUMMARY OF THE INVENTION

The present application provides a system fluid useful during drilling operations having effective rheology and lubricity properties. The system fluid comprises graphite particles having a particle size distribution effective to create a suspension of the graphite particles in the system fluid while providing the effective lubricity properties. The particle size distribution is sufficient to permit greater than 65 wt. % of the graphite particles to pass through a shaker screen having a mesh size of about 80 or less.

The application also provides a spotting fluid comprising graphite particles having an average particle size of greater than about 120 mesh.

DETAILED DESCRIPTION OF THE INVENTION

Figure 1:
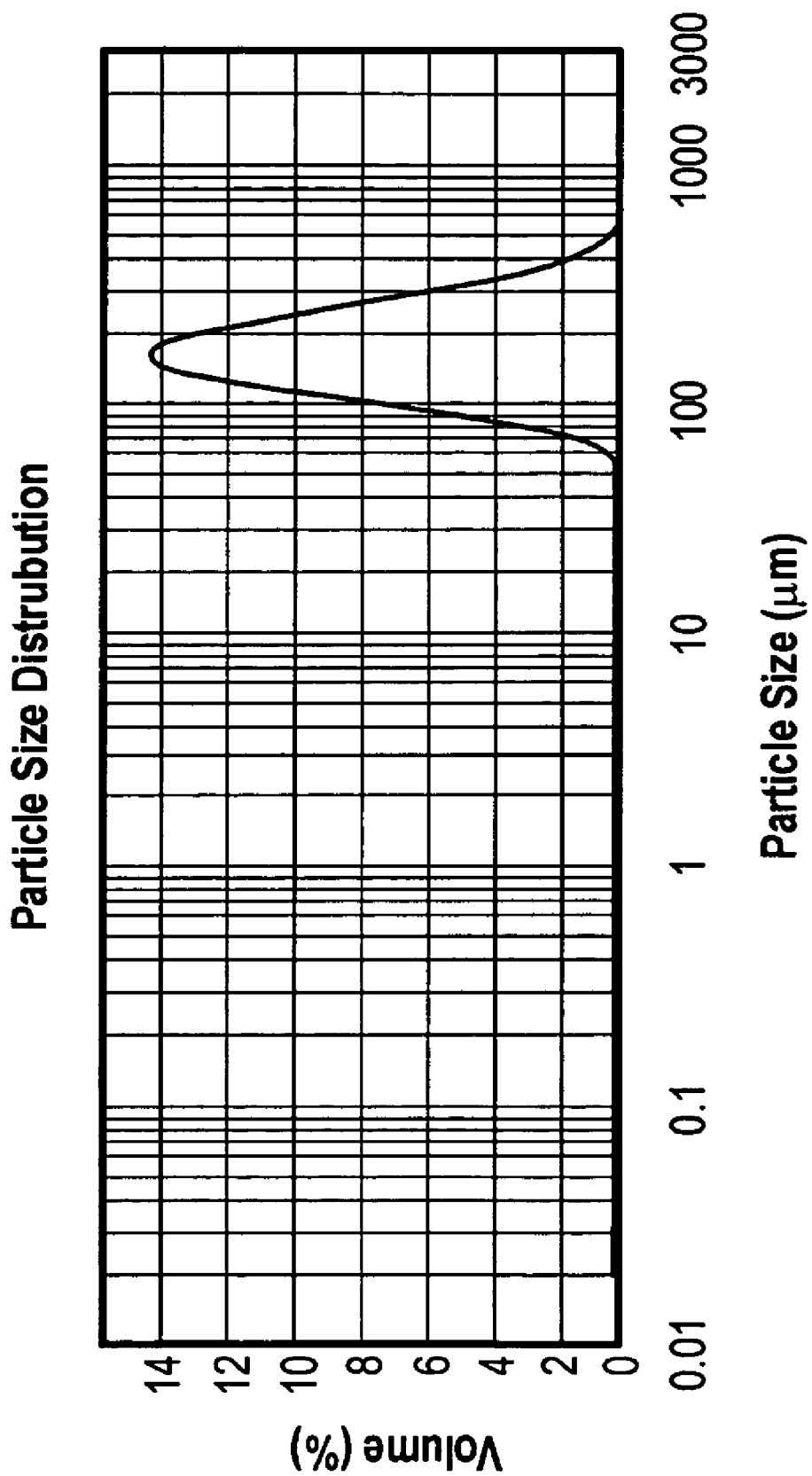
FIG. 1 is a graph of the particle size distribution of the sample in Example 1.

The present application relates to system fluids "useful during drilling operations," including but not necessarily limited to "drilling" fluids, "drill-in" fluids, "completion" fluids, "workover" fluids, and "spotting" fluids. A first group of preferred system fluids, collectively referred to herein as "drilling fluid systems" are selected from the group consisting of "drilling" fluids, "drill-in" fluids, "completion" fluids, and "workover" fluids. Another preferred group of system fluids, herein collectively referred to as "drilling fluids" refers to drilling fluids and drill-in fluids. Another group of preferred system fluids is "spotting" fluids.

A "drill-in" fluid is pumped through the drill pipe while drilling through the "payzone," or the zone believed to hold recoverable oil or gas. A "drilling fluid" is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole. A "completion fluid" is used to protect the "payzone" during the completion phase of the well. Specially formulated fluids are used in connection with completion and workover operations to minimize damage to the formation. Workover fluids are used during remedial work in the well, such as removing tubing, replacing a pump, logging, reperforating, and cleaning out sand or other deposits. Spotting fluids are pumped downhole intermittently for various purposes. Cementing fluids are used cement the well liner in place.

Synthetic graphite particles are commercially available. However, the particle size distribution of commercially available graphites is too large to be optimally effective in system fluids, particularly drilling fluids, and too small to be optimally effective, for example, in spotting fluids or pills used to facilitate casing or liner runs.

Before recirculation to a wellbore, a drilling fluid typically passes through a high speed shaker to remove solids. The particle size distribution of currently available graphite particle mixtures results in much of the graphite being removed from the drilling fluid system as the drilling fluid system passes through the high speed shakers.

On the other hand, where the system fluid is intended to pass through the system only once, as with a spotting fluid or a spotting pill, and during casing and liner runs, it is advantageous for the graphite particles to be as large as possible in order to achieve optimum mechanical lubrication.

The present application provides graphite mixtures having a particle size distribution effective for use in drilling fluid systems. The application also provides graphite particle mixtures having a particle size distribution effective for use in spotting fluids. The application provides methods for using the graphite particle mixtures and system fluids comprising the graphite particle mixtures.

Drilling Fluid Systems

The present application minimizes the amount of graphite particles that must be added during drilling operations to maintain effective lubricity in a drilling fluid system. This is accomplished by providing a drilling fluid system comprising as an integral part a graphite particle mixture having a particle size distribution designed pass through a high speed shaker screen during drilling operations.

High speed shakers used during drilling operations typically have a screen with a mesh size of from about 80 to about 200 mesh. In a preferred embodiment, the graphite particle mixture used in the drilling fluid system comprises a sufficient amount of relatively large graphite particles to reduce torque and drag on the drill bit, but the particles are also small enough that greater than 65 wt. % of the graphite particles pass through the high speed shaker screen. Preferably, about 80 wt. % or more of the graphite particles pass through the shaker screen. The higher the number in the range of from 65 wt. % and about 80 wt. %, the more preferred the number. For example, 67 wt. % or more is more preferable than 66 wt. % or more, etc. In a most preferred embodiment, 80 wt. % or more of the graphite particles pass through the high speed shaker screen.

In a preferred graphite particle mixture for drilling fluid systems, the quantity of graphite particles having a particle size of 60 mesh or less, preferably less than 60 mesh, is from 82 wt. % or more to about 90 wt. % or more. A most preferred graphite mixture for drilling fluid systems comprises 90 wt. % or more of graphite particles having a particle size of 60 mesh or less, preferably less than 60 mesh.

In a preferred graphite particle mixture for drilling fluid systems, the quantity of graphite particles having a particle size of 120 mesh or less is about 25 wt. % or more, preferably about 30 wt. % or more, more preferably about 35 wt. % or more, even more preferably 40 wt. % or more, even more preferably 45 wt. % or more, and even more preferably 50 wt. % or more. A most preferred graphite mixture for drilling fluid systems comprises greater than 50 wt. %, preferably about 90 wt. % or more of graphite particles having a particle size of 120 mesh or less.

A preferred graphite particle mixture for drilling fluid systems comprises a combination of the foregoing. A preferred graphite particle mixture for drilling fluid systems comprises about 82 wt. % or more graphite particles having a particle size of 60 mesh or less, preferably less than 60 mesh, and 25 wt. % or more, preferably 35 wt. % or more, even more preferably 40 wt. % or more, even more preferably 45 wt. % or more, and even more preferably 50 wt. % or more graphite particles having a particle size of 120 mesh or less. An even more preferred graphite particle mixture for drilling fluid systems comprises about 90 wt. % or more graphite particles having a particle size of 60 mesh or less, preferably less than 60 mesh, and 50 wt. % or more graphite particles having a particle size of 120 mesh or less.

Generally, the quantity of graphite material used in a drilling fluid system is from about 4 lb/bbl to about 10 lb/bbl, preferably from about 5 lb/bbl to about 8 lb/bbl.

Formation damage can result when solids and/or filtrate derived from a system fluid invades the formation during drilling operations. Graphite particles have the advantage that the particles tend to act as bridging agents and serve as a lost circulation material.

Spotting Fluid

Greater mechanical lubricity is provided as the size of the graphite particles increases. Because of this, when a system fluid is not designed for continuous recirculation, it is preferred to use relatively larger graphite particles. Fluids which are not designed for continuous recirculation include, but are not necessarily limited to fluids for casing runs, lining runs, and spotting pills used for a variety of purposes, including use in a drilling mode to relieve torque and drag. Fluids which are not designed for continuous recirculation are hereafter collectively referred to as "spotting fluids."

Although the size of the graphite particles used in spotting fluids may be relatively larger, the graphite particles still must be sufficiently small to be suspended in the spotting fluid and transported through the wellbore to the treatment site. A graphite particle mixture suitable for use in a spotting fluid has an average particle size of about 20 mesh or smaller, preferably 40 mesh or smaller. A graphite particle mixture suitable for use in a spotting fluid also has an average particle size of up to 120 mesh or larger, preferably larger than 120 mesh. In a most preferred embodiment, the graphite particles have an average particle size of from about 20 to about 40 mesh.

Generally, the quantity of graphite material used in a spotting fluid is from about 10 lb/bbl to about 50 lb/bbl, preferably from about 20 lb/bbl to about 40 lb/bbl.

The graphite particles used in the system fluids may have a variety of morphologies, including but not necessarily limited to spherical, ellipsoid, conical, cylindrical, cubical, trapezoidal, etc. In a preferred embodiment, the graphite particles have rounded outer surfaces. Preferred morphologies are spherical or ellipsoidal, most preferably spherical. Graphite particles that may be screened or otherwise separated by size to result in the combinations described herein are commercially available from Superior Graphite Co.

The system fluid in which the graphite particles are used may be water-based or oil-based. The phrase "water-based" includes any system fluid comprising water or a water-based solution as the continuous phase, including oil-in-water and oil-in-brine emulsions. The system fluids of the present application also may be oil based. The phrase "oil-based" includes system fluids comprising an organic material as a continuous phase, including water-in-oil and brine-in-oil emulsions, also sometimes called "invert emulsions."

Examples of suitable organic materials for the "oil" of such system fluids include but are not necessarily limited to olefins, paraffins, water insoluble polyglycols, water insoluble esters, diesel, water insoluble Fischer-Tropsch reaction products, and other organic materials, preferably materials that are non-toxic at the concentrations used, and combinations thereof. Suitable olefins are branched and/or linear and preferably are relatively non-toxic synthetic olefins. Examples of preferred olefins include but are not necessarily limited to polyalphaolefins, linear alpha olefins, and internal olefins, typically skeletally isomerized olefins. Most preferred olefins are described in U.S. Pat. Nos. 5,605,872 and 5,851,958, incorporated herein by reference. Preferred paraffins are described in U.S. Pat. No. 5,837,655, incorporated herein by reference.

The "oil" and other components used in the system fluid preferably are non-toxic. As used herein, the term "non-toxic" is defined to mean that a material meets the applicable EPA requirements for discharge into U.S. waters. Currently, a drilling fluid must have an $LC_{50}$ (lethal concentration where 50% of the organisms are killed) of 30,000 parts per million (ppm) suspended particulate phase (SPP) or higher to meet the EPA standards. Preferred system fluids meet relevant environmental standards in the location of the operation.

In order to be effective for use during drilling operations, the particular system fluid must have effective rheology and lubricity properties, and for near balanced and over-balanced drilling, effective fluid loss control properties. Viscosity preferably is controlled by adding certain polymers to the fluid. The system fluid preferably contains polymers that are capable of viscosifying the drilling fluid system and/or providing filtration control for the drilling fluid system. Preferred polymers are non-toxic and will depend upon the base fluid. Suitable polymers include, but are not necessarily limited to water soluble starches and modified versions thereof, water soluble polysaccharides and modified versions thereof, water soluble celluloses and modified versions thereof, and water soluble polyacrylamides and copolymers thereof. Generally, the quantity of polymer used is at least about 1 lb/bbl. or more, preferably about 7 lb/bbl. or more.

Starches that are suitable for use in the system fluids include, but are not necessarily limited to corn based and potato based starches, preferred starches being more temperature stable starches. Polysaccharides that are suitable for use in the system fluids including, but not necessarily limited to xanthan polysaccharides, wellan polysaccharides, scleroglucan polysaccharides, and guar polysaccharides. Celluloses that are suitable for use in the system fluids include, but are not necessarily limited to hydrophobically modified hydroxyethyl celluloses and cationic cellulose ethers. Suitable copolymers of acrylamide include copolymers with acrylate monomers, hydrophobic N-isopropylacrylamide, and the like.

As used herein, the terms "modified starches" and "modified polysaccharides" or "synthetically modified polysaccharides" refer to starches and polysaccharides that have been chemically modified in a manner that renders them inherently non-fermentable in order to avoid the need for a preservative. Water-soluble "modified starches" and "modified polysaccharides" that should operate successfully as water-soluble polymers include, but are not necessarily limited to: hydroxyalkyl starches and polysaccharides; starch and polysaccharide esters; cross-link starches and polysaccharides; hypochlorite oxidized starches and polysaccharides; starch and polysaccharide phosphate monoesters; cationic starches and polysaccharides; starch and polysaccharide xanthates; and, dialdehyde starches and polysaccharides. These derivatized starches and polysaccharides can be manufactured using known means, such as those set forth in detail in Chapter X of *Starch: Chemistry and Technology* 311–388 (Roy L. Whistler, et al. eds., 1984), incorporated herein by reference.

Specific examples of suitable modified starches and modified polysaccharides include, but are not necessarily limited to: carboxymethyl starches and polysaccharides; hydroxyethyl starches and polysaccharides; hydroxypropyl starches and polysaccharides; hydroxybutyl starches and polysaccharides; carboxymethylhydroxyethyl starches and polysaccharides; carboxymethylhydroxypropyl starches and polysaccharides; carboxymethylhydroxybutyl starches and polysaccharides; epichlorohydrin starches and polysaccharides; alkylene glycol modified starches and polysaccharides; and, other starch and polysaccharide copolymers having similar characteristics. Preferred modified starches and/or modified polysaccharides comprise a functional group selected from the group consisting of a carboxymethyl group, a propylene glycol group, and an epichlorohydrin group.

Where the system fluid is water-based, preferred viscosifiers and filtration control agents are biopolymers, including but not necessarily limited to XAN-PLEX™ D, BIO-PAQ™ and/or BIOLOSE™, all of which are commercially available from Baker Hughes INTEQ.

Where the system fluid is oil-base, preferred viscosifiers are organophilic clays and preferred filtration control agents are asphaltic and lignitic materials.

The viscosity of a fluid is its internal resistance to flow as measured in centipoise units. The coefficient of viscosity of a normal homogeneous fluid at a given temperature and pressure is a constant for that fluid and independent of the rate of shear or the velocity gradient. Fluids that obey this rule are "Newtonian" fluids. In fluids called "non-Newtonian fluids," this coefficient is not constant but is a function of the rate at which the fluid is sheared as well as of the relative concentration of the phases. Drilling fluids generally are non-Newtonian fluids. Non-Newtonian fluids frequently exhibit plastic flow, in which the flowing behavior of the material occurs after the applied stress reaches a critical value or yield point (YP). Yield points in drilling fluids are frequently expressed in units of pounds per square 100 feet, wherein the yield point is a function of the internal structure of the fluid.

In drilling, once the critical value or yield point (YP) of the drilling fluid is achieved, the rate of flow or rate of shear typically increases with an increase in pressure, causing flow or shearing stress. The rate of flow change, known as plastic viscosity (PV), is analogous to viscosity in Newtonian fluids and is similarly measured in centipoise units. In drilling fluids, yield points (YP) above a minimum value are desirable to adequately suspend solids, such as weighting agents and cuttings. A drilling fluid system preferably has a yield point of from about 20 to about 50, preferably 30 or more pounds per 100 square feet. A spotting fluid preferably has a yield point of from about 10 to about 50 per 100 square feet.

Conventional additives may be used in the fluid. Such additives include, but are not necessarily limited to shale stabilizer(s), filtration control additive(s), suspending agent(s), dispersant(s), thinner(s), anti-balling additive(s), lubricant(s), weighting agent(s), seepage control additive(s), lost circulation additive(s), drilling enhancer(s), penetration rate enhancer(s), corrosion inhibitor(s), acid(s), base(s), buffer(s), scavenger(s), gelling agent(s), cross-linker(s), catalyst(s), soluble salts, biocides; one or more bridging and/or weighting agents may be added to the fluid, and combinations thereof. Suitable shale stabilizers include, but are not necessarily limited to polyglycols, inorganic salts, chelates, amines, alkanolamines, alkanolamides, amphoteric compounds, alone or in aqueous solutions, and mixtures thereof. Suitable shale stabilizing inorganic salts include, but are not necessarily limited to alkali metal salts, silicate salts, and aluminum salts. Acids include acids used to treat cement contamination.

Preferred systems for use with the graphite particles include, but are not necessarily limited to NEW-DRILL, CLAY-TROL, AQUA-DRILL, SYN-TEQ, CARBO-DRILL®, and UNI-CAL, which are commercially available from Baker Hughes INTEQ, Houston, Tex.

The fluid is prepared using conventional procedures. Generally in water based fluids, the pH of the fluid is measured and, if needed, adjusted to from about 8.5 to about 11.5, preferably about 9.5. The pH preferably is adjusted using a suitable organic base as a buffer. Substantially any buffer may be used. Suitable buffers include, but are not necessarily limited to ethanolamines (preferably triethanolamines), alkali metal hydroxides, preferably sodium or potassium hydroxide, alkali metal acetates, preferably sodium or potassium acetate. Preferred buffers are alkali metal oxides, most preferably magnesium oxide.

The application will be better understood with reference to the following Examples:

EXAMPLE 1

A sample of synthetic spherical graphite (GLIDEGRAPH 7001) was obtained from Superior Graphite Co. to assess the particle size. The product specification for GLIDEGRAPH-7001, available from Superior Graphite Co., states under "Typical Properties" that the particle size is "85% within 70 & 200-Mesh. +99% greater than 200 mesh."

Two tests were run to quantify spherical particle size of the sample. In a first test, an eluent of 80 ml deionized water solution containing 5 g sodium citrate was tested using the Malvern MASTERSIZER 2000 Laser Instrument. A standard was created, using a refractive index of 2.42. The ultrasonic option was used to assist the graphite sample in dispersion. The particle size distribution was from about 35 to about 200 mesh, as illustrated in FIG. 1, and given in the following Table:

| Parameter | Vol. below % |
|---|---|
| 35 Mesh | 99.93 |
| 40 Mesh | 99.01 |
| 45 Mesh | 96.38 |
| 50 Mesh | 90.80 |
| 60 Mesh | 81.74 |
| 70 Mesh | 68.91 |
| 80 Mesh | 53.73 |
| 100 Mesh | 37.69 |
| 120 Mesh | 22.87 |
| 140 Mesh | 11.54 |
| 170 Mesh | 4.31 |
| 200 Mesh | 0.93 |

The graphite sample also was tested using U.S.A. standard testing sieves and a RO-TAP shaker. Each sieve was weighed prior to adding the sample for tare weight. After the sieves were assembled, with the smaller mesh number on top and increasing downward, a 50 g sample of the GLIDE GRAPH 7001 was placed on the top sieve. The following were the results:

| Parameter | Wt. % Through |
|---|---|
| 30 Mesh | 100.0 |
| 40 Mesh | 99.18 |
| 60 Mesh | 87.84 |
| 80 Mesh | 65.00 |
| 100 Mesh | 48.18 |
| 120 Mesh | 28.22 |
| 140 Mesh | 15.76 |
| 200 Mesh | 0.4 |

EXAMPLE 2

Figure 2:
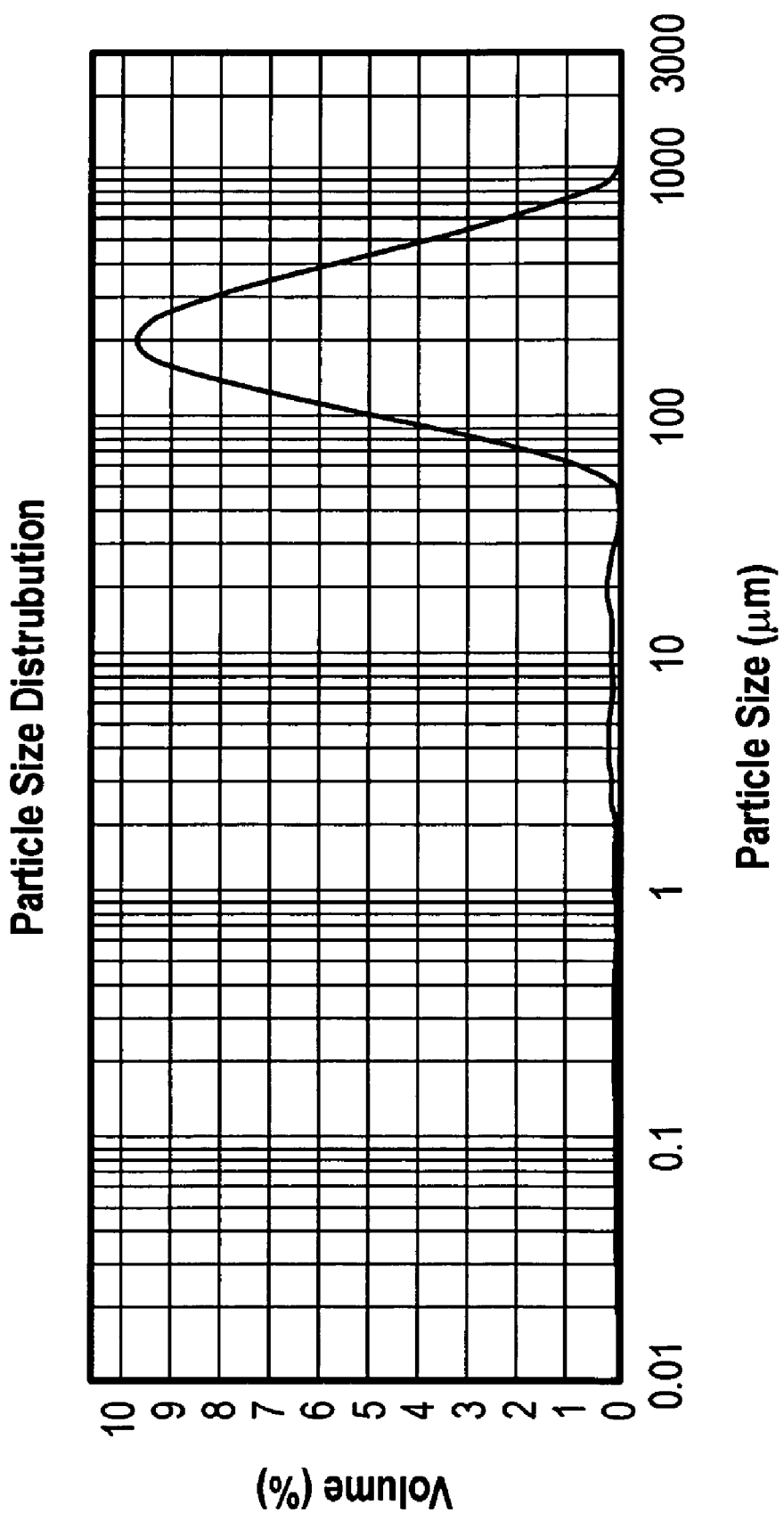
FIG. 2 is a graph of particle size distribution of the "coarse" fraction of the sample in Example 2.

50 g of GLIDEGRAPH 7001 were split into a "coarse" fraction and a "fine" fraction using a 200 mesh screen. The particle size distribution of each sample was measured using a Malvern MASTERSIZER 2000 Laser Instrument. The particles in the coarse fraction generally were from about 20 to about 270 mesh, with a majority of the particles being greater than 70 mesh (100 vol. %–49.85 vol. %=50.15 vol. %). Only about 39.23 vol. % (100 vol. %–60.77 vol. %) of the particles were 60 mesh or larger. About 19.92 vol. % of the particles in the "coarse" fraction had a particle size of 120 mesh or less. FIG. 2 is a graph of the particle size distribution for the "coarse" fraction. The following Table gives the corresponding data related to the mesh sizes of the particles depicted in FIG. 2:

| Mesh No. | Vol. Below % |
|---|---|
| 12 | 100.00 |
| 14 | 100.00 |
| 16 | 100.00 |
| 18 | 100.00 |
| 20 | 99.82 |
| 25 | 98.79 |
| 30 | 98.53 |
| 35 | 92.68 |
| 40 | 87.08 |
| 45 | 79.86 |
| 50 | 70.85 |
| 60 | 60.77 |
| 70 | 49.85 |
| 80 | 39.10 |
| 100 | 28.92 |
| 120 | 19.92 |
| 140 | 12.86 |
| 170 | 7.83 |
| 200 | 4.84 |
| 230 | 3.44 |
| 270 | 2.91 |
| 325 | 2.91 |
| 400 | 2.91 |

Figure 3:
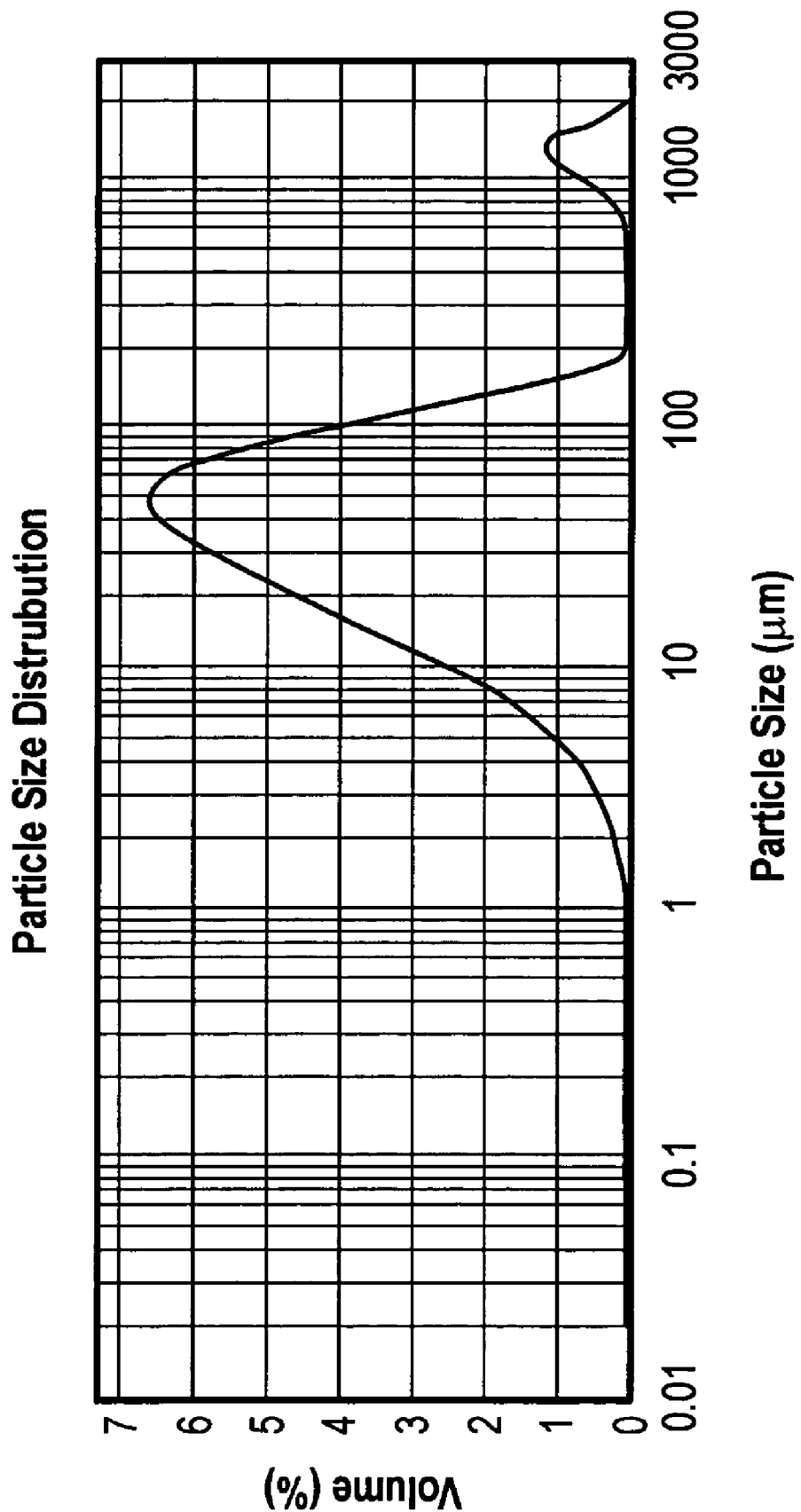
FIG. 3 is a graph of the particle size distribution of the "fine" fraction of the sample from Example 2.

The particles in the fine fraction had a mesh size of from about 12 to about 1100, with about 92.6 vol. % having particle size of less than 120 mesh, and 95.51 vol. % having a particle size of less than about 60 mesh. FIG. 3 is a graph of the particle size distribution of the "fine" fraction. The following Table gives the corresponding data related to the mesh sizes of the particles depicted in FIG. 2:

| Mesh No. | Vol. Below % |
|---|---|
| 10 | 100.00 |
| 12 | 99.74 |
| 14 | 98.75 |
| 18 | 97.48 |
| 20 | 96.43 |
| 25 | 95.84 |
| 30 | 95.60 |
| 35 | 95.53 |
| 40 | 95.51 |
| 45 | 95.51 |
| 50 | 95.51 |
| 60 | 95.51 |
| 70 | 95.51 |
| 80 | 95.43 |
| 100 | 94.61 |
| 120 | 92.60 |
| 140 | 89.18 |
| 170 | 84.27 |
| 200 | 78.21 |
| 230 | 71.81 |
| 270 | 64.49 |
| 325 | 56.51 |
| 400 | 49.30 |

Persons of ordinary skill in the art will recognize that many modifications may be made to the present application without departing from the spirit and scope of the application. The embodiment described herein is meant to be illustrative only and should not be taken as limiting the application, which is defined in the claims.

We claim:

1. A method for minimizing the amount of graphite used during drilling operations, the method comprising performing drilling operations using a drilling fluid system having effective rheological and fluid loss control properties, the drilling fluid system comprising a mixture of graphite particles having a particle size distribution effective to permit from about 65 to about 80 wt. % of the graphite particles to pass through a shaker screen having a mesh size of about 80 mesh or smaller during said drilling operations.

2. The method of claim 1 wherein 82 wt. % or more of the graphite particles have a particle size of 60 mesh or smaller.

3. The method of claim 2 wherein 35 wt. % or more of the graphite particles have a particle size of 120 mesh or smaller.

4. The method of claim 3 comprising using the drilling fluid system comprising from about 5 lb/bbl to about 10 lb/bbl of the mixture of graphite particles.

5. The method of claim 2 wherein 50 wt. % or more of the graphite particles have a particle size of 120 mesh or smaller.

6. The method of claim 5 comprising using the drilling fluid system comprising from about 5 lb/bbl to about 10 lb/bbl of the mixture of graphite particles.

7. The method of claim 1 wherein 90 wt. % or more of the graphite particles having a particle size of 60 mesh or smaller.

8. The method of claim 7 comprising using the drilling fluid system comprising from about 5 lb/bbl to about 10 lb/bbl of the mixture of graphite particles.

9. The method of claim 1 wherein 82 wt. % or more of the graphite particles have a particle size of smaller than 60 mesh.

10. The method of claim 9 comprising using the drilling fluid system comprising from about 5 lb/bbl to about 10 lb/bbl of the mixture of graphite particles.

11. The method of claim 1 wherein 90 wt. % or more of the graphite particles have a particle size of smaller than 60 mesh.

12. The method of claim 11 comprising using the drilling fluid system comprising from about 5 lb/bbl to about 10 lb/bbl of the mixture of graphite particles.

13. The method of claim 1 wherein 35 wt. % or more of the graphite particles have a particle size of 120 mesh or smaller.

14. The method of claim 13 comprising using the drilling fluid system comprising from about 5 lb/bbl to about 10 lb/bbl of the mixture of graphite particles.

15. The method of claim 1 wherein 50 wt. % or more of the graphite particles have a particle size of 120 mesh or smaller.

16. The method of claim 15 comprising using the drilling fluid system comprising from about 5 lb/bbl to about 10 lb/bbl of the mixture of graphite particles.

17. A method for minimizing the amount of graphite used during drilling operations, the method comprising performing drilling operations using a drilling fluid system having effective rheological and fluid loss control properties; the drilling fluid system comprising from about 5 lb/bbl to about 10 lb/bbl of a mixture of graphite particles having a particle size distribution effective to permit from about 65 to about 80 wt. % of the graphite particles to pass through a shaker screen having a mesh size of about 80 mesh or smaller during said drilling operations.

18. The method of claim 17 comprising using the drilling fluid system comprising from about 5 lb/bbl to about 8 lb/bbl of the mixture of graphite particles.

19. A method for minimizing the amount of graphite used during drilling operations, the method comprising performing drilling operations using a drilling fluid system having effective rheological and fluid loss control properties, the drilling fluid system comprising from about 5 lb/bbl to about 10 lb/bbl of a mixture of graphite particles, wherein 82 wt. % or more of the graphite particles have a particle size of 60 mesh or smaller.

20. The method of claim 19 comprising using the drilling fluid system comprising from about 5 lb/bbl to about 8 lb/bbl of the mixture of graphite particles.

* * * * *

Disclaimer

7,087,555 — William S. Halliday, Cypress, TX (US); David W. Schwertner, The Woodlands, TX (US); S. Dwight Strickland, Kingwood, TX (US). DRILLING FLUIDS COMPRISING SIZED GRAPHITE PARTICLES. Patent dated Aug. 8, 2006. Disclaimer filed Aug. 1, 2011, by the inventor William S. Halliday.

Hereby disclaims claims 1-65 of the patent.

*(Official Gazette, January 31, 2012)*